United States Patent [19]

Evangelist, Jr.

[11] Patent Number: 5,052,443
[45] Date of Patent: Oct. 1, 1991

[54] MOBIL APPARATUS FOR SALVAGING MOTOR VEHICLE FUEL

[76] Inventor: Albert Evangelist, Jr., 617 Longview Dr., Huntington Valley, Pa. 19006

[21] Appl. No.: 547,472

[22] Filed: Jul. 2, 1990

[51] Int. Cl.[5] .............................................. B65B 3/00
[52] U.S. Cl. .................................. 137/899; 137/565; 141/231
[58] Field of Search ...................... 141/364, 231, 106; 137/899, 899.2, 899.4, 565

[56] References Cited

U.S. PATENT DOCUMENTS

| | | | |
|---|---|---|---|
| 3,820,577 | 6/1974 | Sidebottom | 141/231 |
| 4,235,264 | 11/1980 | Rau et al. | 141/231 |
| 4,638,841 | 1/1987 | Heath | 141/231 |

Primary Examiner—A. Michael Chambers
Attorney, Agent, or Firm—Benasutti

[57] ABSTRACT

A mobile apparatus for salvaging fuel from abandoned vehicles includes a fuel settling tank and a fuel storage tank mounted on a wheeled trailer. The settling tank has a trough with screened opening into which vehicle fuel tanks may be removed and placed to drain into the settling tank. The settling tank has a valved drain port near its lowest potion to drain water and sediment after the salvaged fuel has settled, and is mounted above the height of the storage tank to allow gravity feed of clear fuel through a valved transfer tube between the tanks. The clear salvaged fuel is pumped out of the storage tank for use.

2 Claims, 1 Drawing Sheet

MOBIL APPARATUS FOR SALVAGING MOTOR VEHICLE FUEL

BACKGROUND OF THE INVENTION

This invention relates to the salvage of abandoned or wrecked motor vehicles, and more particularly to removal of the fuel tanks and salvaging the fuel from such vehicles.

Municipalities and local governments typically engage automobile salvage yards to remove abandoned or wrecked motor vehicles from road sides, parking lots and other public properties. Private owners may also engage such salvage yards to remove non-functional vehicles from private property. In many instances, these vehicles are in an advanced state of deterioration, and must be towed to the salvage yard. The fuel tanks of the motor vehicles are frequently weakened by impact or rusted from prolonged exposure to the elements, and must be removed prior to salvaging the vehicle. In addition, salvers are interested in preventing fuel spills on their property, where it would become a ground contaminate. Consequently, it has been the practice of automobile salvage yards to first disconnect and remove the fuel tanks before salvaging or crushing the abandoned vehicle.

Once removed, the fuel tanks become a handling problem for the salvage company. In prior practice, the tank openings were stuffed with rags to avoid spillage until they were carried to a point in the yard where they were poured into cans, where the fuel was emptied and disposed of. The tanks were then flushed with water before being crushed for disposal and processing as salvage metal. In this prior art practice, the fuel tanks were an unwieldy item which had to be carried to a collection point and hand emptied into containers, and particularly in those instances where tank were severely deteriorated, had to be protected from cracking and spilling the fuel. Further, the fuel in such tanks is often contaminated by rust particles and other debris, and by water condensate from standing idle for an extended period of time.

For the above reasons, it is an object of the present invention to provide a mobil apparatus which may be towed to the abandoned vehicle, and the fuel tank removed and drained into it at the site and during transit to the next abandoned vehicle or removed to other locations owned or managed by the company.

It is a further objective that the mobile apparatus be able to reclaim the fuel in the tanks in the abandoned vehicle for use in other motor vehicles, particularly the salvage vehicles at the yard. These and other advantages of the apparatus of this invention will become apparent upon review of the drawings and description which follows.

BRIEF SUMMARY OF THE INVENTION

This invention provides a mobile apparatus for salvaging motor vehicle fuel. The apparatus is mounted upon a wheeled trailer which may be towed by a suitable vehicle having a trailer hitch to the site where an abandoned vehicle is located. In practice, the salvage crew may remove several abandoned vehicles to the yard on the same day, and will in such instances tow the mobile apparatus from one vehicle to the next, removing the vehicle fuel tanks as they go.

The apparatus has two large metal fuel drums mounted upon it, with one drum acting as a fuel settling tank and the other acting as a fuel storage tank. The fuel settling tank is mounted on a raised mount of the trailer so that it is higher than the storage tank, thus allowing atmosphere pressure feed from the settling tank to the storage tank. The settling tank is provided with a trough on an upper external side, so that the fuel tanks can be removed from the vehicle and placed in the trough to drain fuel into the settling tank. The trough is of sufficient size to accommodate at least two fuel tanks at the same time. By this arrangement, the fuel tanks can be simply removed from the motor vehicles, placed in the trough, and the apparatus moved to the next site or back to the yard while the tanks are draining.

Once the tanks are drained, they can be removed to be flushed and disposed. The fuel from the tanks, along with water and particle contaminants, remains in the settling tank, but by the well known property that motor vehicle fuels have a low specific gravity, the water and particulate matter soon settles to the bottom of the settling tank after it has been at rest for a sufficient time.

A drain port is located at the lowest portion of the settling tank to drain off the water and sediment. The drain valve is closed when clear fuel begins to come through the port. Approximately one-fifth to one-eighth height up the side of the settling tank is located a transfer port which allows the clear fuel to feed through a transfer tube and valve into the storage tank. A compressed air activated demand pump mounted on the trailer draws fuel out of the storage tank when required, and pumps it through a flexible hose and fuel nozzle into a motor vehicle.

DETAILED DESCRIPTION OF THE DRAWING

Figure 1:
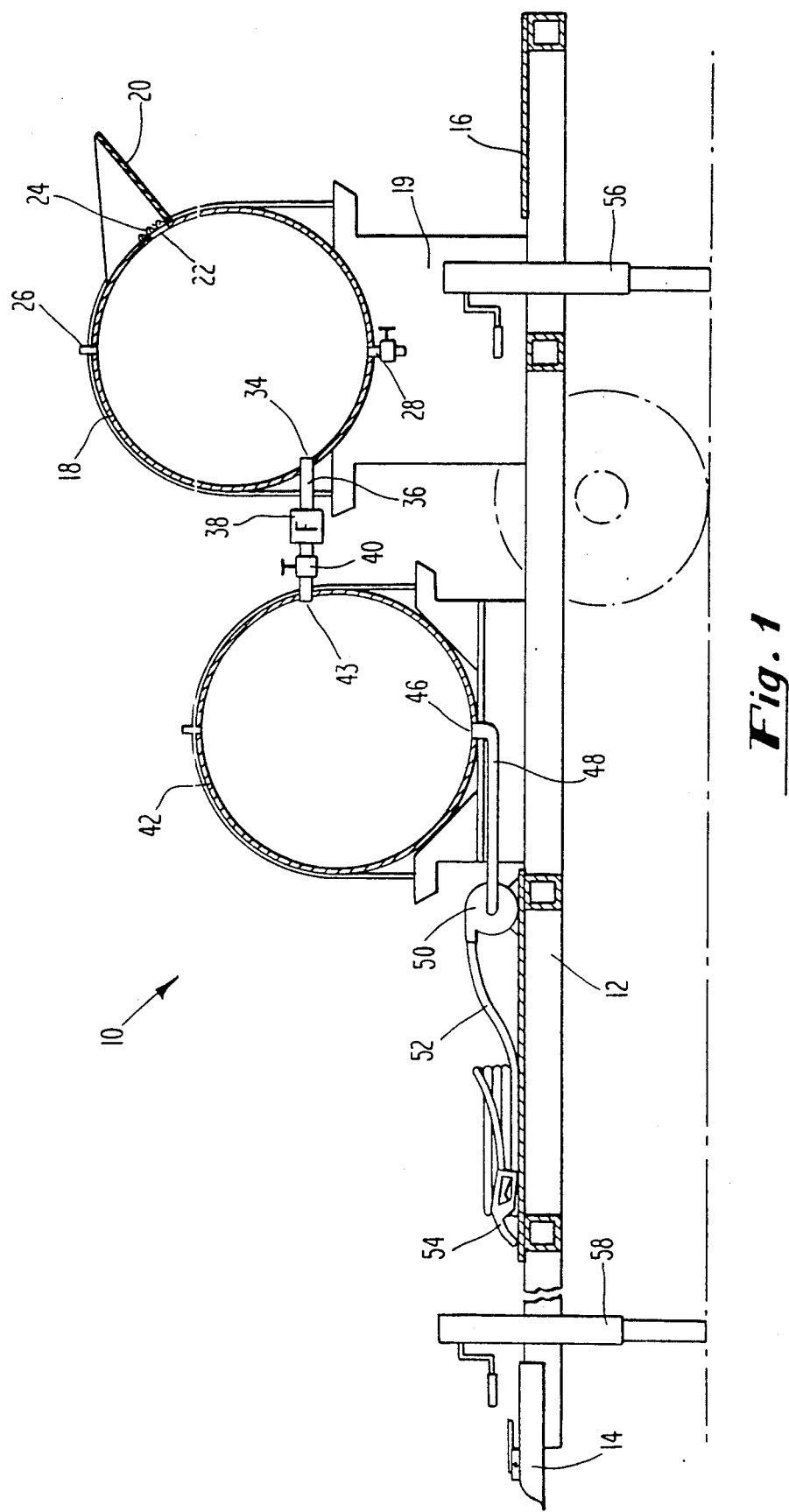
FIG. 1 is a cross-section view of the invention.

In FIG. 1, there is depicted in section a mobile apparatus 10 for salvaging motor vehicle fuel. The apparatus 10 includes a wheeled trailer 12 with a conventional tow bar 14, which may be attached to any suitable vehicle having a towing hitch. At the opposite end of the trailer 12 is a step platform 16 on which the tow crew personnel may stand to deposit a fuel tank from an abandoned vehicle in the settling tank. The settling tank 18 is a large cylindrical metal drum, mounted on a raised two-post saddle mount 19 and secured by bands. At the upper rear side of the tank 18 is a trough 20 to receive fuel tanks from abandoned vehicles. The bottom of the trough 20 terminates in a slot opening 22 into the settling tank 18. The slot opening 22 is covered by a wire mesh screen 24 which serves as a large particle filter.

In operation, the apparatus 10 is towed to the site of an abandoned vehicle, where the salvage crew removes the abandoned vehicle's fuel tank and deposits it in the trough 20 with an orifice facing downward, so that the contents of the fuel tank drain through the screen 24 and slot opening 22 into the settling tank 18. As soon as the fuel tank is placed in the trough, the crew can move to the next site or back to the salvage yard while the fuel tank drains into the settling tank 18. The length of the trough 20 is such that several fuel tanks can be placed into it at the same time, thus the crew may go from one abandoned vehicle to the other, place the fuel tanks in the trough, and remove the empty tanks for disposal when they return to the yard.

The fuel in the settling tank is usually contaminated by water condensate, rust particles and other small particle debris which are not trapped by the screen 24. However, since fuel has a lower specific gravity than water, the water and particulate matter soon settles to the bottom of the settling tank 18 once it is parked at rest in the yard for a sufficient period of time; one or two hours usually being sufficient. A vent 26 allows fuel vapors to escape.

A drain port 28 is located at the lowest point of the settling tank 18, between the posts of the saddle mount 19. When the drain port 28 is opened, the content of settling tank 18 can be drained into a container for disposal. The crew drains water and particulate matter through the drain port 28 until clear fuel begins to come through the port, then the drain port 28 is closed.

A transfer port 24 is located in the circular wall of the settling tank between approximately one-fifth to one-eighth height from the lowest point of the settling tank. By locating the transfer port 34 at this height, it is usually in an area of clear fuel after the water and particle matter is drained through the drain port 28. The transfer port 34 is connected to a transfer tube 36, which includes a filter 38 and a manual valve 40. The other end of the transfer tube 36 connects to a storage tank 42 at an inlet port 43. The storage tank 42 is another cylindrical metal drum essentially identical to settling tank 18, except that it is mounted on the trailer 12 at a lower position than tank 18, so that when valve 40 is opened, fuel will drain from the settling tank 18 by atmospheric pressure feed into the storage tank 42. The filter 38 collects any floating or suspended particles, and can be removed for cleaning or replacement.

Storage tank 42 has a vent at its upper side to allow fuel fumes to escape and to maintain ambient pressure. An outlet port 46 is located near the bottom of storage tank 42, and is connected by an outlet tube 48 to a compressed air demand pump 50. Pump 50 may alternatively be powered electrically or by combustion engine. A flexible fuel hose 52 terminating in a standard fuel nozzle 54 is connected to the output of pump 50. Hence, the clear fuel in storage tank 42 can be pumped into a motor vehicle, usually the salvage yard vehicles, and used by them.

To stabilize the apparatus in a level position when it is not connected to a tow vehicle by the trailer hitch, it is provided with fore and aft jack stands 56, 58. The jack stands are of a conventional type in which a handle is rotated to extend the support legs to the desired height by rotating the threaded legs inside a threaded barrel.

The stands 56, 58 can also be used to stabile the platform when personnel are standing on it to place or remove fuel tanks from the trough.

From this description, it can be seen that the objectives of providing convenient means to handle the fuel tanks and fuel from abandoned vehicles is provided, and the further objective of reclaiming the fuel for use is also accomplished.

What is claimed is:

1. A mobile apparatus for salvaging motor vehicle fuel comprising:

a wheeled trailer;

a fuel settling tank mounted in a raised position on the trailer;

said tank having, at an upper external side portion thereof, a trough for receiving and draining one or more vehicle fuel tanks;

said settling tank further having a screened opening to the trough to allow fuel to drain from vehicle fuel tanks through the screened opening into the settling tank;

a drain port located at or near a lowest portion of the settling tank to drain water and particulate matter from the bottom of the settling tank;

valve means to open and close the drain port;

a transfer port, located in a side portion of the settling tank between approximately a one-fifth to one-eight height from the lowest point of the settling tank;

a storage tank mounted on the trailer in a position lower than the settling tank;

said storage tank having an inlet port located on a side portion thereof and an atmosphere vent located in an upper portion thereof;

a transfer tube connecting the transfer port of the settling tank to the inlet port of the storage tank, said tube having a valve means to selectively allow fuel to flow from the settling tank into the storage tank; and an outlet port located at or near the lowest portion of the storage tank.

2. An apparatus as in claim 1, further comprising:

said outlet port being connected to a pump for pumping fuel out of the storage tank; and a flexible hose, terminating at one end in a motor vehicle fuel nozzle, and connected at its other end to the pump, for pumping fuel from the storage tank into a motor vehicle.

* * * * *